July 29, 1969  C. NYBERG  3,457,954
VALVE MEMBER HAVING PLURAL FLOW OPENINGS
Filed May 12, 1966  3 Sheets-Sheet 1

INVENTOR.
Carl Nyberg
BY
Pierce, Schiffler & Parker
Attorneys

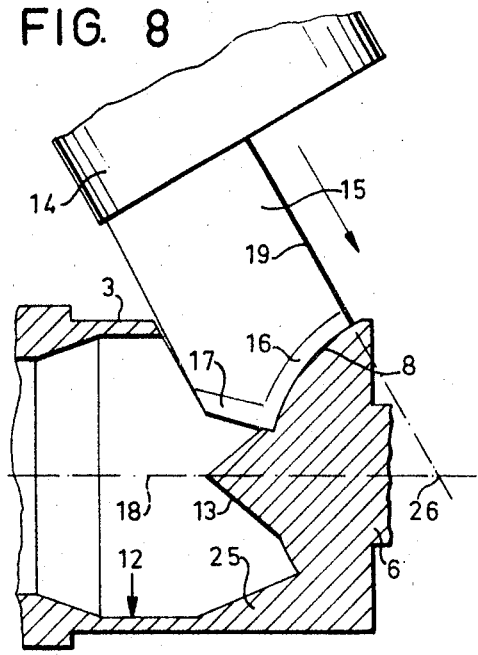
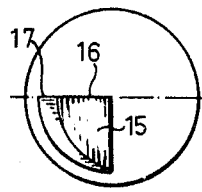
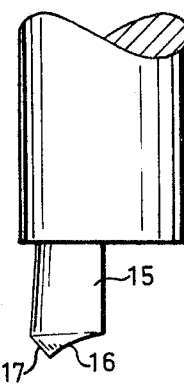
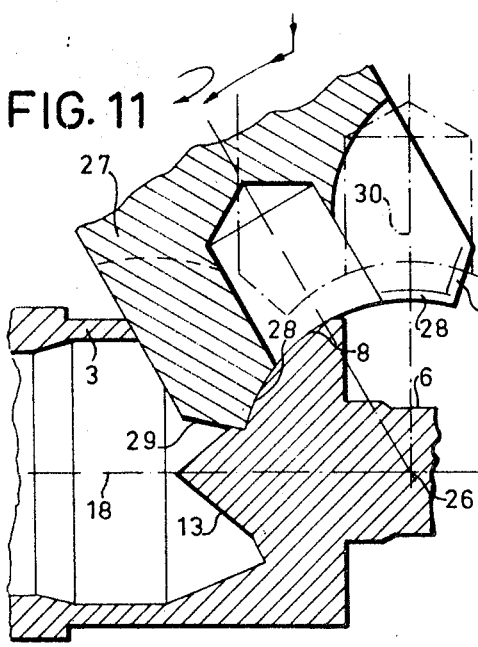
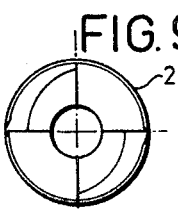
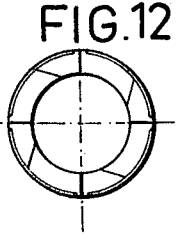
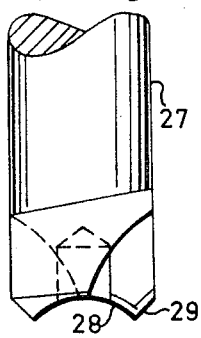
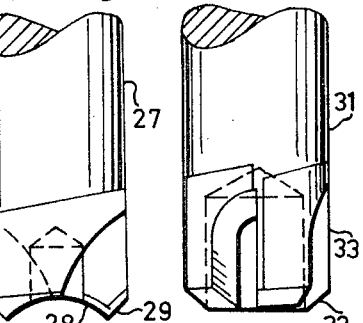

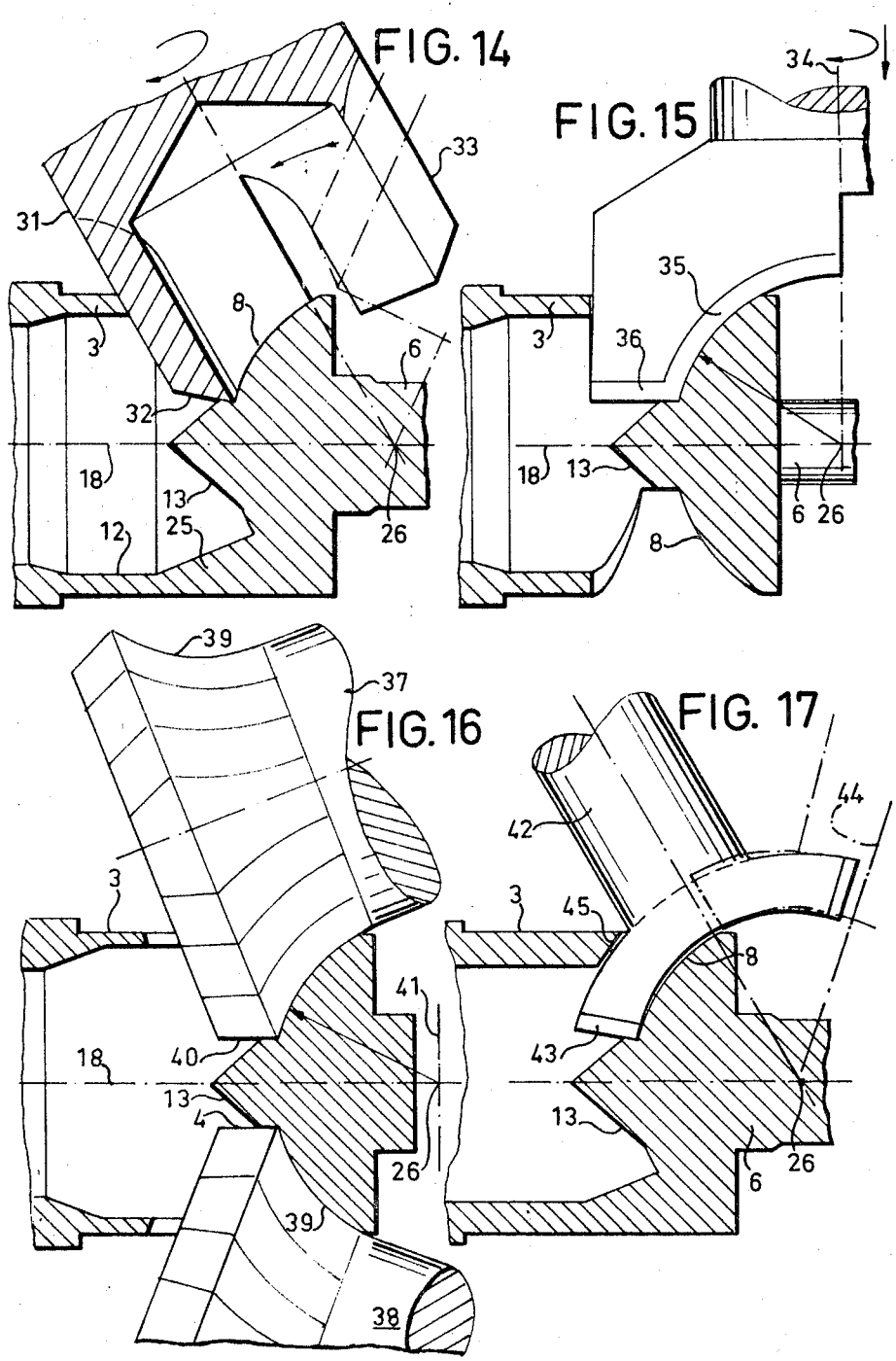

United States Patent Office 3,457,954
Patented July 29, 1969

3,457,954
VALVE MEMBER HAVING PLURAL FLOW OPENINGS
Carl Nyberg, Elsaborgsvagen 32, Skovde, Sweden
Filed May 12, 1966, Ser. No. 549,660
Claims priority, application Sweden, May 21, 1965, 6,694/65
Int. Cl. F16k *15/00;* F16l *37/28, 37/22*
U.S. Cl. 137—625.28                     3 Claims

ABSTRACT OF THE DISCLOSURE

In a valve member comprising (1) a cylindrical body portion having a bottom at one end and an axial boring extending to the bottom, (2) a valve head, at the bottom end of the body, and (3) at least two openings in the body said openings providing flow openings adjacent the valve head, the improvement which consists in locating said openings in such proximity to the bottom as partially to be defined by portions of the bottom which portions are in turn defined by arcuately convex parts of a surface of revolution.

---

This invention relates to valve members of the type comprising a cylindrical body or skirt having a bottom at one end and an axial boring extending to the bottom, a valve head provided at the bottom end of said body, and at least two openings in said skirt, said openings being made by milling so as to form through flow openings near the bottom or valve head, the bottom being connected to the skirt exclusively by means of the remaining axial skirt portions between the openings.

In valve members of this kind it is of highest importance to obtain a resistance to flow as low as possible. This is possible on condition that the openings can be made sufficiently large without considerable reduction of the strength and that the portions around the openings are as streamlined as possible. If the valve member is produced by casting these requirements can be comparatively easily fulfilled by suitable formation of the valve member, but casting has the disadvantage that it requires subsequent machining of the work piece. If the work piece is of complicated shape in order to provide favourable flow conditions the subsequent machining is of course correspondingly complicated and expensive. It is therefore desirable to produce the valve member by machining and is as few working steps as possible required for making the openings and for drilling the boring in the cylindrical body. The drilling operation involves no difficulties. As regards the openings it has hitherto not been realised that the flow conditions can be considerably improved by a suitable formation of the bottom of the valve member. A method hitherto applied is to drill obliquely backwardly directed holes. However, in this case there remain radial spokes which result in an undesirable resistance to flow. According to another conventional method the openings are made by means of a cylindrical side milling cutter which is fed transversely of the cylindrical body, resulting in a transverse groove having parallel long sides and end sides. One side of the groove forms a plane part of the bottom of the valve member, and the plane bottom parts at the various openings form together a plane bottom. Such a plane bottom causes, however, a comparatively high flow resistance at the transition from the cavity to the openings of the valve member.

The present invention is based on the insight that it is possible by means of a milling tool to form the bottom substantially like a segment of a sphere with a view to reduce the resistance to flow. This milling operation can be effected in different manners all of which are as simple or practically as simple to perform as the known milling by means of cylindrical side milling cutters. By means of suitable milling tools and adequate mode of operation resulting in a substantially spherical bottom it is possible to provide openings which are rounded at their rear ends, this being advantageous from the point of view of flow conditions as well as strength. The front ends of the openings can be formed without difficulty such that the convex bottom defines the front sides of the openings which front sides consequently exert a relatively low flow resistance to the fluid passing through the valve member in the open position thereof.

The invention is characterized in that the openings are located in such proximity to the bottom as to be partly defined by portions of the bottom which portions are defined by concave parts of a surface of revolution. This surface of revolution is preferably a spherical surface which is advantageous from the point of view of manufacturing. The valve member formed in accordance with the invention can be manufactured by the simple method indicated in the annexed claims.

These and further features and advantages of the invention will be explained in the following description of several exemplified embodiments of a valve member according to the invention and of the method of manufacturing such valve member.

FIGS. 7a and 7b illustrate an example of a milling tool of the cylindrical side milling cutter type for making the openings.

FIG. 8 is an enlarged view of the milling tool shown in FIG. 7b in its end position after milling the cylindrical body illustrated.

FIGS. 9 and 10 illustrate another type of milling cutter for making the openings and the convex bottom portions shown in FIG. 11.

FIGS. 12 and 13 illustrate a further type of milling cutter for machining the valve member shown in FIG. 14.

FIG. 15 illustrates a modified milling tool for making the openings.

FIG. 16 shows two form cutters for making the illustrated valve member according to the invention.

FIG. 17 illustrates a still further modification of the milling operation according to the invention.

Figure 1:
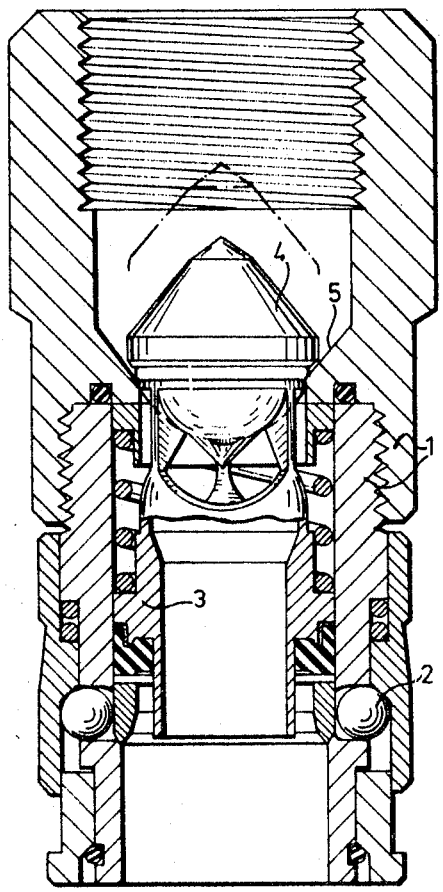
FIG. 1 is a longitudinal sectional view of a coupling consisting of a coupling sleeve and a valve member axially movable in the sleeve and formed in accordance with the invention. The coupling is used for a fluid under pressure, such as air or oil, passing through the coupling in either direction.
Figure 2:
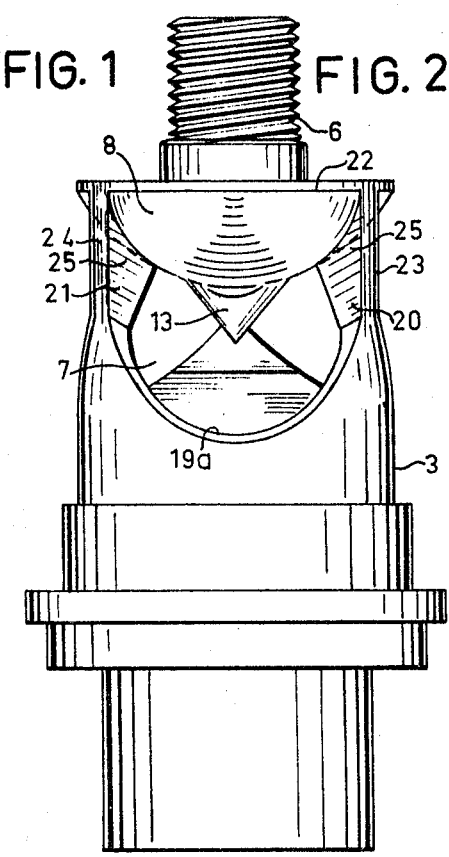
FIG. 2 is an enlarged elevation of the valve member shown in FIG. 1 without the valve head.
Figure 3:
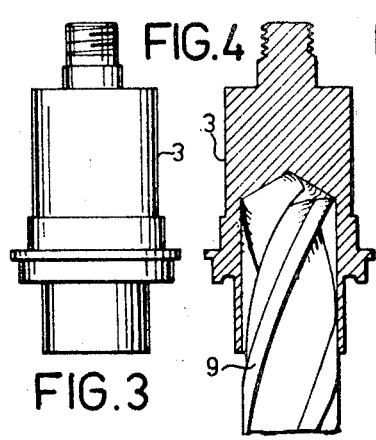
FIG. 3 illustrates the cylindrical body of the valve member prior to internal machining and cutting of the openings.

The coupling illustrated in FIG. 1 comprises a conventional two-part coupling sleeve 1 having balls 2 for locking a nipple (not shown). Displaceably mounted in the sleeve is a valve member comprising a cylindrical body or skirt 3 which at one end is provided with a valve head 4 screwed onto a stud 6 (FIG. 2). In closed position of the valve the head effects a seal together with a seat 5. The open position of the valve head is indicated by a chain-dotted line. As will be seen from FIGS. 1 and 2 the skirt 3 of the valve has flow openings 7 located adjacent the convex bottom portions 8 of the valve member.

Figure 4:
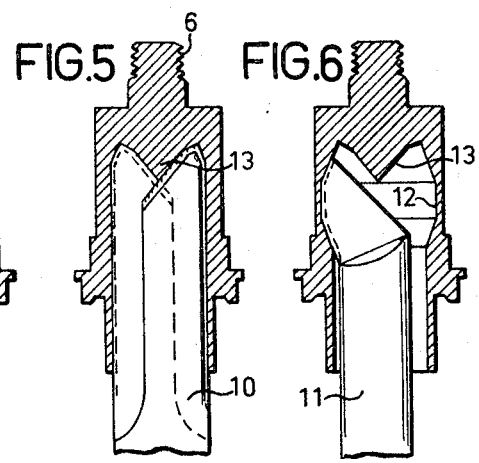
FIGS. 4 to 6 illustrate the different steps of operation for drilling the boring of the cylindrical body. Advantageously, these steps are carried out after the milling of the openings, but for the sake of clearness the figures illustrate the drilling operation prior to the milling operation.
Figure 5:
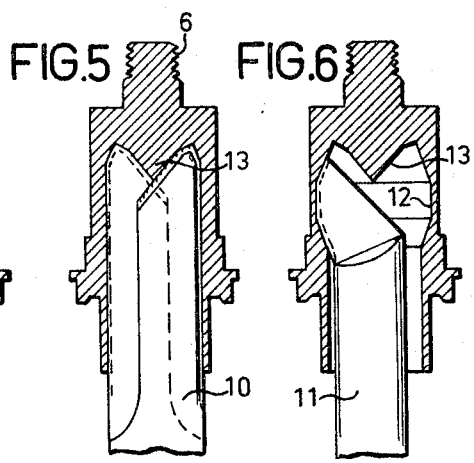
Figure 6:
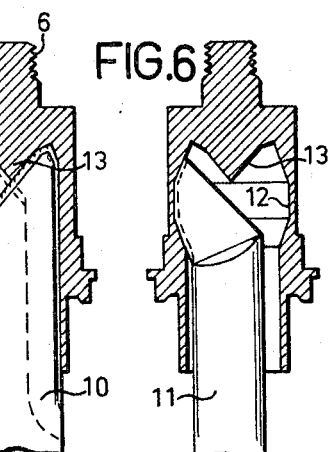

As shown in FIG. 4 a boring is first made in the member 3 with a drill 9. Then the bottom of the boring is shaped by means of a forming drill 10, as is shown in FIG. 5. The next step is a final machining according to FIG. 6 by means of a turning tool 11 which forms widened portions 12 at the bottom end so as to provide an expansion chamber which improves the flow conditions. A conical projection 13 is left in the drilling operation according to FIG. 5 and in the turning operation according to FIG. 6. The purpose of this projection is still more to reduce the resistance to flow.

The milling tool shown in FIGS. 7a and 7b comprises a shank 14 and an axially directed tool steel 15 having a cutting edge 16 in the form of an arc of a circle and an obliquely backwardly directed end edge 17. From the following description it will be apparent how this tool is used for making the openings 7 and simultaneously forming the convex bottom portions 8 of the openings.

In the examples illustrated in FIGS. 1, 2, 8, 11, 14 and 17 three equally spaced apart openings 7 are provided, but it is of course possible to make two openings only, as shown in FIGS. 15 and 16, if this is possible with regard to the structural strength. If three openings are made three stays or bars will remain between the openings. The stays are favourable from the point of view of buckling strength. With two openings and two opposite stays there is a somewhat greater risk of buckling, which, however, in certain cases can be compensated for by use of a suitable material and by somewhat wider stays.

In all embodiments illustrated the axis of the cylindrical body 3 is indicated at 18.

In the milling operation shown in FIG. 8 the member 3 is chucked and the milling tool 14 is fed in the direction of its axis 19 into the end position shown. While in FIG. 8 only one milling cutter is illustrated preferably all of the openings are simultaneously made by means of a corresponding number of milling cutters. Alternatively the openings may be cut one after another by means of a single cutter in which case the member 3 has to be turned one step after each cutting operation resulting in a longer working time. In this case the cutter may be stationary while the member 3 is swung with respect to the cutter.

As will be seen from FIG. 8, the milling tool, after having been fed into its end position, has formed an opening 7 having a smoothly rounded edge 19a (FIG. 2) and two parallel lateral edges 20, 21. The front edge 22 of the opening is formed by the outer edge of the spherical or convex bottom portion 8 between the bars or stays 23 and 24.

The stays 23, 24 are increasing in thickness toward their end portions 25 at the bottom 8.

During the feed the axis 19 of the tool is directed toward the center of the spherical bottom portion 8 to be formed, and as shown in FIG. 8, this center preferably lies on the axis 18 of the valve member 3. In the end position of the tool the center of the arcuate cutting edge 16 coincides with the point 26.

From the above it will be seen that the convex or substantially spherical portion 8 forms part of a surface of revolution created by rotation of the arc 16 about the axis 19 if the center of the arc coincides with the point 26.

FIGS. 9, 10 and 11 illustrate a milling cutter 27 which in the first place is intended for valve members of relatively great diameter as compared with the valve member shown in FIG. 8. This cutter has circularly arranged arcuate edges 28 and obliquely backwardly directed end edges 29.

As shown by chain-dotted lines in FIG. 11, the cutter 27 is first fed radially inwardly with its axis 30 directed through the point 26 and at right angles to the axis 18. During this movement part of the opening and part of the bottom portion 8 are formed. Thereafter the cutter is swung about the point 26 into the end position shown.

FIGS. 12, 13 and 14 illustrate a further embodiment of the tool for machining valve members of comparatively great diameter. In this embodiment the milling cutter 31 has a plurality of obliquely backwardly directed end edges 32 and axial side edges 33 which during swinging movements of the tool from the initial position shown in FIG. 14 by chain-dotted lines into the end position shown by full lines form the spherical botom portion 8 and at the same time cut the opening 7 in the skirt 3 of the valve member.

In FIGS. 8, 11 and 14 the axis of the milling cutter in the end position thereof makes an oblique angle with the axis of the valve member.

FIG. 15 illustrates a modification in which the axis 34 of the milling cutter intersects the point 26 and extends at right angles to the axis 18 throughout the movement of the cutter into the end position. The cutter has one or more arcuate edges 35 and one or more straight end edges 36.

In the modification shown in FIG. 16 there are provided two stationary side milling cutters 37 and 38 having arcuate edges 39 and oblique edges 40. In this case the milling operation is effected by swinging the valve member 3 about an axis 41 wihch is located at right angles to the axis 18 and passes through the center 26 of the sphere which is tangent to the surfaces of revolution generated by the edges 39 upon rotation of the milling cutter.

In this embodiment two openings only and corresponding spherical bottom portions are formed.

Finally FIG. 17 illustrates an embodiment in which the milling cutter 42 has a plurality of circularly arranged end edges 43. As the axis 44 of the rotating cutter 42 is swung about the point 26 from the position shown by chain-dotted lines into the illustrated end position the edges 43 form the spherical bottom portion 8 and a corresponding opening 45 in the skirt of the valve member 3. In this case the length of the opening 45 is somewhat less than in the preceding embodiment, but since this length is approximately equal to the distance through which the valve member is displaced during its movement from closed to opened position according to FIG. 1, the size of the opening is sufficient because the side edges of the opening are substantially parallel and even in this case extend to the bottom portion 8. As will be seen from FIG. 17, the edge of the opening 45 is oblique in the direction of flow with the result that the thickness of the skirt of the valve member is of less influence upon the resistance to flow than in the other embodiments. In FIG. 17 this fact is illustrated by a somewhat thicker skirt of the valve member 3.

It will be apparent from the above description and the embodiments illustrated that the substantially spherical bottom portions can be milled in different ways within the scope of the invention.

Practical tests have clearly proved that the spherical bottom portion result in a considerable decrease of the flow resistance.

I claim:
1. In a valve member comprising a cylindrical skirt having a bottom at one end and an axial boring extendign to the bottom,
   a valve head provided at the bottom end of said skirt,
   and at least two openings in said skirt, said openings being made by milling so as to form flow openings only near the bottom or valve head,
   the bottom being connected to the skirt exclusively by means of the remaining axial skirt portions between the openings,
   the improved structure according to which the openings are located in such proximity to the bottom as to be partly defined by portions of the bottom
   which portions are defined by convex parts of a surface of revolution the profile of which is substantially in the form of an arc of a circle so that the respective convex portions of the bottom form parts of a substantially spherical surface the center of which is located substantially on the axis of the cylindrical body, the skirt portions between the openings having the form of axial bars having substantially parallel sides along part of their lengths.

2. A valve member as defined in claim 1, in which the central part of the bottom is a conical body of revolution forming a central projection extending from the convex bottom portions.

3. A valve member as defined in claim 1, in which the cylindrical body is so drilled that the stay-forming skirt portions between the openings increase in thickness toward their junctions with the bottom.

References Cited

UNITED STATES PATENTS

| 1,807,636 | 6/1931 | Robin | 251—149.6 |
| 2,173,295 | 9/1939 | Coles et al. | 251—149.6 XR |
| 2,495,081 | 1/1950 | Thomas | 137—219 |
| 3,052,261 | 9/1962 | Nyberg | 251—149.6 XR |

FOREIGN PATENTS 451,418  8/1936  Great Britain.

DANIEL BLUM, Primary Examiner

U.S. Cl. X.R.

29—157.1, 558; 251—149.6